US012775836B1

(12) United States Patent
Aydore et al.

(10) Patent No.: US 12,775,836 B1
(45) Date of Patent: Oct. 27, 2026

(54) ADVERSARIAL TRAINING OF DEEP NEURAL NETWORKS USING NON-UNIFORM PERTURBATIONS

(71) Applicant: Amazon Technologies, Inc., Seattle, WA (US)

(72) Inventors: Sergul Aydore, Brooklyn, NY (US); Jeffrey Earl Bickford, Thornton, CO (US); Ecenaz Erdemir, London (GB); Luca Melis, New York City, NY (US); MohamadAli Torkamani, Scarsdale, NY (US)

(73) Assignee: Amazon Technologies, Inc., Seattle, WA (US)

( * ) Notice: Subject to any disclaimer, the term of this patent is extended or adjusted under 35 U.S.C. 154(b) by 990 days.

(21) Appl. No.: 17/217,705

(22) Filed: Mar. 30, 2021

(51) Int. Cl.
*G06N 3/08* (2023.01)
*G06F 17/16* (2006.01)
*G06N 3/04* (2023.01)

(52) U.S. Cl.
CPC ............... *G06N 3/08* (2013.01); *G06F 17/16* (2013.01); *G06N 3/04* (2013.01)

(58) Field of Classification Search
CPC .. G06N 3/08; G06N 3/04; G06F 17/16; G06F 7/78
See application file for complete search history.

(56) References Cited

U.S. PATENT DOCUMENTS 10,546,240 B1 * 1/2020 Resnick .................. G06N 5/04
11,055,443 B1 * 7/2021 Ling ........................ G06N 3/08
2019/0026466 A1 * 1/2019 Krasser .................... G06N 7/01
2020/0394512 A1 * 12/2020 Zhang .................... G06N 7/023
2021/0049413 A1 * 2/2021 Ma .......................... G06F 21/56
2021/0350272 A1 * 11/2021 Miroshnikov ......... G06N 20/20
2021/0406368 A1 * 12/2021 Agranonik .............. G06F 17/18
2022/0019900 A1 * 1/2022 Wong ..................... G06N 3/084
2022/0094709 A1 * 3/2022 Sharma ............... G06F 18/2415
2022/0131832 A1 * 4/2022 Ho ...................... H04L 63/1408

OTHER PUBLICATIONS

Anderson, H. S. and Roth, P. Ember: An Open Dataset for Training Static PE Malware Machine Learning Models. arXiv preprint arXiv: 1804.04637, 2018, Apr. 16, 2018, URL: https://arxiv.org/pdf/1804.04637.pdf, 8 pages.

(Continued)

*Primary Examiner* — Kamran Afshar
*Assistant Examiner* — Steven Phung
(74) *Attorney, Agent, or Firm* — Athorus, PLLC

(57) ABSTRACT

Disclosed are systems and methods for training deep neural networks ("DNNs") to increase the detection robustness of those DNNs to adversarial attacks through the use of non-uniform perturbations of training data that consider feature characteristics of features of the training data that are used to train the DNN. Features of training data are perturbed in a non-uniform manner based at least in part on the correlations of the different features and/or the importance of those features in detection of malicious data by the DNN.

20 Claims, 7 Drawing Sheets

(56) References Cited

OTHER PUBLICATIONS

Anderson, Hyrum. Defcon's AIVillage: Machine Learning Static Evasion Competition. Elasticsearch B.V. Published Aug. 21, 2019. [Accessed Apr. 14, 2021] URL: https://www.elastic.co/blog/machine-learning-static-evasion-competition, 3 pages.
Ballet, V., et al. Imperceptible Adversarial Attacks on Tabular Data. arXiv preprint arXiv:1911.03274, 2019, Dec. 13, 2019, URL: https://arxiv.org/pdf/1911.03274.pdf, 9 pages.
Biggio, B., et al. Evasion Attacks Against Machine Learning at Test Time. In Joint European Conference on Machine Learning and Knowledge Discovery in Databases, pp. 387-402. Springer, 2013, URL: https://link.springer.com/content/pdf/10.1007%2F978-3-642-40994-3_25.pdf.
Dvijotham, K. (DJ), et al. A Dual Approach to Scalable Verification of Deep Networks. In Proceedings of the Thirty-Fourth Conference, Annual Conference on Uncertainty in Artificial Intelligence, Auai, (UAI-18), Aug. 6-10, 2018, Aug. 3, 2018, URL: https://arxiv.org/pdf/1803.06567.pdf, 14 pages.
Gehr, T., et al. Ai2: Safety and Robustness Certification of Neural Networks with Abstract Interpretation. In 2018 IEEE Symposium on Security and Privacy (SP), pp. 3-18. IEEE, 2018, URL: https://files.sri.inf.ethz.ch/website/papers/sp2018.pdf.
Goodfellow, I. J., et al. Explaining and Harnessing Adversarial Examples. arXiv preprint arXiv:1412.6572, 2014, Dec. 20, 2014, URL: https://arxiv.org/pdf/1412.6572v1.pdf, 10 pages.
Ilyas, A., et al. Adversarial Examples are not Bugs, they are Features. In Advances in Neural Information Processing Systems, vol. 32, pp. 125-136. Curran Associates, Inc., 2019, URL: https://papers.nips.cc/paper/2019/file/e2c420d928d4bf8ce0ff2ec19b371514-Paper.pdf.
Kurakin, A., et al. Adversarial Examples in The Physical World, 2017, Feb. 11, 2017, URL: https://arxiv.org/pdf/1607.02533.pdf, 14 pages.
Kurakin, A., et al. Adversarial Machine Learning at Scale. arXiv preprint arXiv:1611.01236, 2016, Nov. 4, 2016, URL: https://arxiv.org/pdf/1611.01236v1.pdf, 15 pages.
Levy, E., et al. Not All Datasets Are Born Equal: On Heterogeneous Data and Adversarial Examples. arXiv preprint arXiv:2010.03180, 2020, Oct. 7, 2020, URL: https://arxiv.org/pdf/2010.03180.pdf, 9 pages.
Li, D. and Li, Q. Adversarial Deep Ensemble: Evasion Attacks and Defenses for Malware Detection. IEEE Trans-actions on Information Forensics and Security, 15:3886-3900, 2020, Jun. 30, 2020, URL: https://arxiv.org/pdf/2006.16545.pdf, 14 pages.
Liu, C., et al. On Certifying Non-uniform Bounds Against Adversarial Attacks. In Chaudhuri, K. and Salakhutdinov, R. (eds.), Proceedings of the 36th International Conference on Machine Learning, vol. 97 of Proceedings of Machine Learning Research, PMLR, pp. 4072-4081, Long Beach, California, USA, Jun. 9-15, 2019., URL: http://proceedings.mlr.press/v97/liu19h/liu19h-supp.pdf.
Liu, N., et al. Adversarial Detection with Model Interpretation. In Proceedings of the 24th ACM SIGKDD International Conference on Knowledge Discovery & Data Mining, KDD 2018, Aug. 19-23, 2018, London, United Kingdom, pp. 1803-1811, URL: https://people.engr.tamu.edu/xiahu/papers/kdd18liu.pdf.
Lundberg, S. M. and Lee, S.-I. A Unified Approach to Interpreting Model Predictions. 31st Conference on Neural Information Processing Systems (NIPS 2017), Long Beach, CA, USA. URL: https://papers.nips.cc/paper/2017/file/8a20a8621978632d76c43dfd28b67767-Paper.pdf, 10 pages.
Mądry, A., et al. Towards Deep Learning Models Resistant to Adversarial Attacks. arXiv preprint arXiv:1706.06083, Jun. 19, 2017, URL: https://arxiv.org/pdf/1706.06083v1.pdf, , 22 pages.
Mahalanobis, P. C. On the Generalized Distance in Statistics. Statistical Laboratory, Presidency College, Calcutta. Proceedings of the National Institute of Sciences of India, 1, Park Street, vol. 2, No. 1, pp. 49-55, Published Apr. 15, 1936, Read Jan. 4, 1936, Printed by P. Knight, Baptist Mission Press, 41, Lower Circular Road. URL: http://bayes.acs.unt.edu:8083/BayesContent/class/Jon/MiscDocs/1936_Mahalanobis.pdf, 7 pages.
Mirman, M., et al. Differentiable Abstract Interpretation for Provably Robust Neural Networks. Proceeding of the 35th International Conference on Machine Learning, Stockholm, Sweden, PMLR 80, pp. 3578-3586, 2018, URL: http://proceedings.mlr.press/v80/mirman18b/mirman18b-supp.pdf, 13 pages.
Pierazzi, F., et al. Intriguing Properties of Adversarial ML Attacks in the Problem Space. In 2020 IEEE Symposium on Security and Privacy (SP), pp. 1332-1349. IEEE, 2020, Mar. 16, 2020, URL: https://arxiv.org/pdf/1911.02142.pdf, 18 pages.
Raghunathan, A., et al. Semidefinite Relaxations for Certifying Robustness to Adversarial Examples. In 32nd Conference on Neural Information Processing Systems, (NIPS 2018), Montreal, Canada, pp. 10877-10887, Nov. 2, 2018, URL: https://arxiv.org/pdf/1811.01057.pdf, 12 pages.
Rosenberg, I., et al. Generating End-To-End Adversarial Examples for Malware Classifiers Using Explainability. In 2020 International Joint Conference on Neural Networks (IJCNN), pp. 1-10. IEEE, Auckland University of Technology, Downloaded on Oct. 26, 2020, URL: https://elidavid.com/pubs/adversarial-explainability.pdf, 10 pages.
Shapley, L. S. Notes on the n-Person Game—II: The Value of an n-Person Game. U.S. Air Force, Project Rand, RM-670, Astia Document No. ATI 210720, Aug. 21, 1951, RAND Corporation, 1700 Main St., Santa Monica, CA, 1951, URL: https://www.rand.org/pubs/research_memoranda/RM0670.html, 19 pages.
Singh, G., et al. Fast and Effective Robustness Certification. In 32nd Conference on Neural Information Processing Systems (NeurIPS 2018), Montreal, Canada, 31:10802-10813, 2018, URL: https://proceedings.neurips.cc/paper/2018/file/f2f446980d8e971ef3da97af089481c3-Paper.pdf, 12 pages.
Sinha, A., et al. Certifying Some Distributional Robustness with Principled Adversarial Training. arXiv preprint arXiv:1710.10571, May 1, 2020, URL: https://arxiv.org/pdf/1710.10571.pdf, 49 pages.
Szegedy, C., et al. Intriguing Properties of Neural Networks. arXiv preprint arXiv:1312.6199, 2013, Dec. 21, 2013, URL: https://arxiv.org/pdf/1312.6199v1.pdf, 9 pages.
Tsipras, D., et al. There Is No Free Lunch In Adversarial Robustness (But There Are Unexpected Benefits). ArXiv, abs/1805.12152, 2018, May 30, 2018, URL: https://arxiv.org/pdf/1805.12152v1.pdf, 19 pages.
Wang, S., et al. Mixtrain: Scalable Training of Formally Robust Neural Networks. arXiv preprint arXiv: 1811.02625, 2018, Dec. 1, 2018, URL: https://arxiv.org/pdf/1811.02625.pdf, 15 pages.
Wong, E. and Kolter, J. Z. Learning Perturbation Sets for Robust Machine Learning. arXiv preprint arXiv: 2007.08450, 2020, Oct. 8, 2020, URL: https://arxiv.org/pdf/2007.08450.pdf, 32 pages.
Wong, E. and Kolter, J. Z. Provable Defenses Against Adversarial Examples via the Convex Outer Adversarial Polytope. Proceedings of the 35th International Conference on Machine Learning, Stockholm, Sweden, pp. 5286-5295. PMLR, 2018, URL: http://proceedings.mlr.press/v80/wong18a/wong18a.pdf, 10 pages.
Wong, E., et al. Fast is Better Than Free: Revisiting Adversarial Training. arXiv preprint arXiv:2001.03994, 2020, Jan. 12, 2020, URL: https://arxiv.org/pdf/2001.03994.pdf, 17 pages.
www.virustotal.com. Virus Total. [accessed May 13, 2021] URL: https://www.virustotal.com/gui/, www.virustotal.com, 1 page.
Zeager, M. F., et al., Adversarial Learning in Credit Card Fraud Detection. In 2017 Systems and Information Engineering Design Symposium (SIEDS), Center for Visual and Decision Informatics, pp. 112-116. IEEE, Apr. 2017, DOI:10.1109/SIEDS.2017.7937699, URL: https://www.researchgate.net/publication/317296994_Adversarial_learning_in_credit_card_fraud_detection, 6 pages.
Zhang, H., et al. Efficient Neural Network Robustness Certification with General Activation Functions. In 32nd Conference on Neural Information Processing Systems (NeurIPS 2018), Montreal, Canada, pp. 4939-4948, 2018, URL: https://proceedings.neurips.cc/paper/2018/file/d04863f100d59b3eb688a11f95b0ae60-Paper.pdf, 10 pages.

* cited by examiner

ADVERSARIAL TRAINING OF DEEP NEURAL NETWORKS USING NON-UNIFORM PERTURBATIONS

BACKGROUND

Deep neural networks ("DNNs") are commonly used in a wide variety of security-critical applications such as self-driving cars, spam detection, malware detection and medical diagnosis. However, DNNs have been shown to be vulnerable to adversarial examples, which are perturbed inputs designed to fool the machine learning systems. In an attempt to mitigate this problem, adversarial training of the DNNs are performed in an effort to improve the robustness of the DNNs. The goal during adversarial training of a DNN is to minimize the loss of the DNN when perturbed samples are used. This way, the model becomes robust to real-world adversarial attacks.

In traditional adversarial training, input features, such as pixels of an input image, are trained and perturbation is eventually applied to all pixels of different input images that are used to train the DNN, resulting in uniform perturbations of the inputs. While such techniques prove beneficial for inputs in which the features are independent, such as pixels of an image, in other applications such as fraud detection, spam detection, credit card default prediction, and malware detection, such techniques are inadequate because the features of the inputs are not independent of one another.

DETAILED DESCRIPTION

Figure 1C:
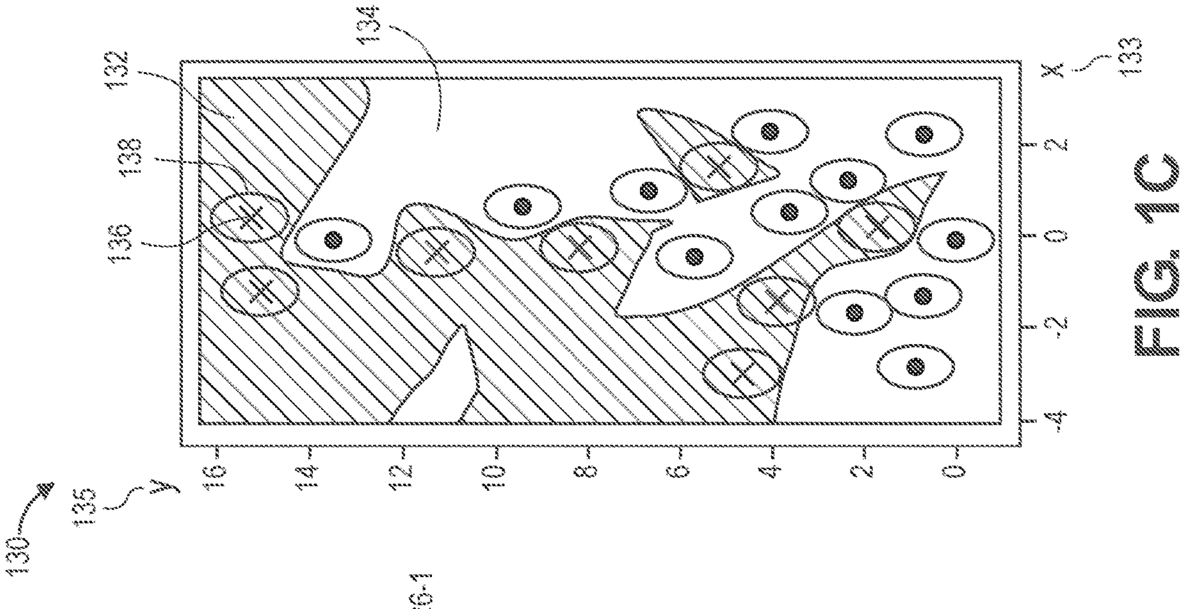
FIG. 1C is a graph illustrating classification boundaries from adversarial training with non-uniform perturbation limits, in accordance with disclosed implementations.

Disclosed are systems and methods for training DNNs to increase the detection robustness of those DNNs to adversarial attacks through the use of non-uniform perturbations of training data that consider the feature characteristics of features of the training data that are used to train the DNN. As discussed further below, features of training data are perturbed in a non-uniform manner based at least in part on the correlations of the different features and/or the importance of those features in detection of malicious data by the DNN. For example, if a DNN is being trained to detect against credit card application fraud, features of the training data may include the applicant's age, annual salary, number of dependents, etc. Rather than treat those features as independent and equal, the disclosed implementations determine correlations between the features and perform non-uniform perturbations of those inputs to generate perturbed training data that is used to train the DNN. For example, rather than uniformly perturbing the inputs of age and annual salary by the same amount, such as 10,000, which would make no sense in this example, the disclosed implementations determine correlations or relationships between the features and further determine non-uniform perturbations for those features. For example, it may be determined that the feature of age should be perturbed by a first amount, such as 5 years, and the feature of salary should be perturbed by a second amount, such as $10,000, that is different than the first amount.

Adversarial training can be represented as a min-max optimization problem. Given a dataset $$\{x_i, y_i\}_{i=1}^{n}$$

with input $x_i \in \mathbb{R}^d$ and classes $y_i \in Y$, the objective of adversarial training is denoted by:

$$\min_{\theta} \frac{1}{n} \sum_{i=1}^{n} \max_{\delta \epsilon \Delta} l(f_\theta(x_i + \delta), y_i) \quad (1)$$

where $f_\theta: \mathbb{R}^d \rightarrow Y$ is DNN function, l(.) is the loss, e.g., cross-entropy, Δ is the set of possible perturbations around the original samples, and δ is the perturbation. The adversary's objective is the inner maximization term in equation (1), and the perturbed samples found as a solution to the norm-constrained inner maximization are referred to herein as adversarial examples ("AEs"). As noted above, existing solutions utilize a set Δ of possible perturbations that are uniform. In comparison, the disclosed implementations determine a set Δ of possible perturbations that are non-uniform.

In addition, traditional techniques for adversarial training treat each feature of the data equally. For example, in image applications, each pixel (feature) of an input image is treated equally and the pixels are limited to a legitimate interval such that the perturbation of each pixel is imperceptible. However, for other domains, such as malware detection, finance, etc., the features may not be equal and/or may represent different variables with different scales. As a result of these feature differences, the notion of imperceptibility of a perturbation may be different for each feature of the training data. The disclosed implementations, in addition to producing non-uniform perturbations, determine which features of the training data to perturb based on the determined importance and/or correlation of those features.

For example, a DNN may be trained to detect for malware in third party data (an adversarial attack). However, unlike image data, diverse and semantically meaningful features may be extracted from malware (training data), which may be an executable file, and passed to the DNN. To maintain the functionality of the executable file during an adversarial attack, certain features may be immutable and perturbations may result in an unrealistic scenario. For example, in the phone malware space, application permissions, such as permission to access a location service of a phone, are required for malicious functionality and cannot be perturbed. In a finance scenario where customer credit card applications are evaluated by machine learning models, a possible set of features of input data/training data include age, gender, income, savings, education level, number of dependents, etc. In this type of data there are clear dependencies between features, for example the number of dependents has a meaningful correlation with age. When detecting spammers within social networks, features are extracted from accounts and may include the length of the username, length of user description, number of following and followers as well as the ratio between them, percentage of bidirectional friends, number of posted messages per day, etc. Similar to the previous finance example, there is a meaningful correlation between features such as the percentage of bidirectional friends and the ratio of followers. Because of the correlation between features of the data and/or that some features are immutable, to improve the robustness of a trained DNN, perturbations of training data should not be uniform and features should be treated as more important/less important for perturbations as well as determining which features of the training data should and should not be perturbed.

Figure 1B:
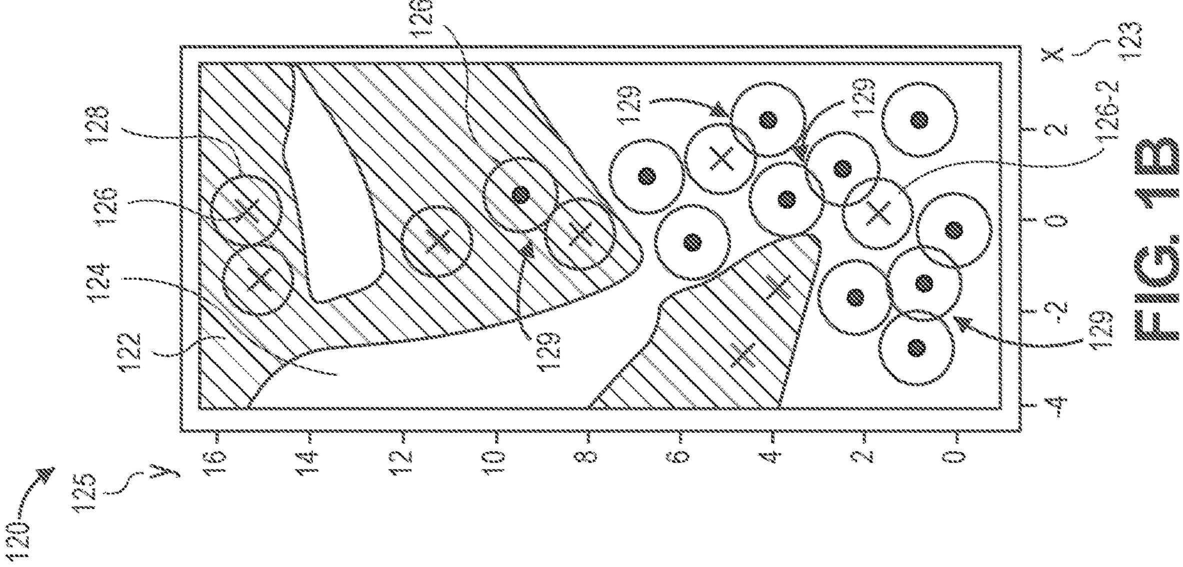
FIGS. 1A and 1B are graphs illustrating classification boundaries from adversarial training with uniform perturbation limits.
Figure 1A:
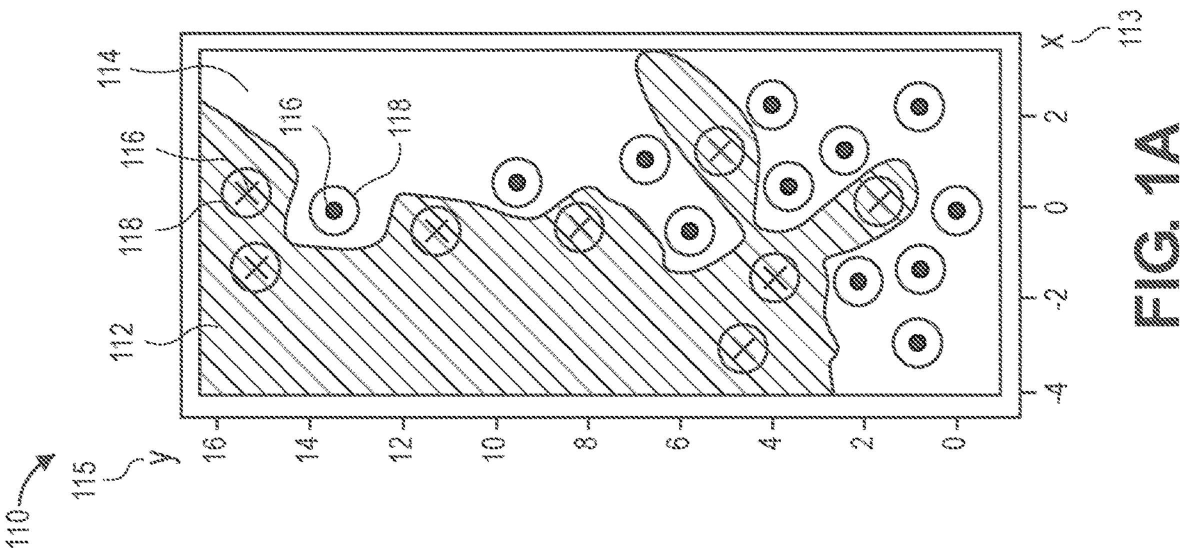

FIGS. 1A, 1B, and 1C are graphs illustrating two-dimensional image classification boundaries from adversarial training with uniform perturbations having different constraints (FIGS. 1A and 1B) compared to non-uniform perturbations (FIG. 1C) using different constraints along different axes of the graph, in accordance with disclosed implementations.

Referring first to FIG. 1A, the graph 110 illustrates adversarially robust decision boundaries with a first region 112 and second region 114, and $l_2$-norm perturbation constraints 118 around the data points 116. FIG. 1A illustrates that a trained DNN with a uniform perturbation constraint 118 of $|\delta\|_2 \leq 0.5$, selected to fit allowable perturbations along the x-axis 113, gains robustness against input perturbations. However, as illustrated, while the robustness is sufficient in the x-axis 113, there remains uncovered regions in the y-axis 115, resulting in the overall training of the DNN being insufficient due to the constraint limitation and the uniformity of the constraint in the x-axis and γ-axis.

In comparison and referring to FIG. 1B, the graph 120 illustrates adversarially robust decision boundaries with a first region 122 and second region 124, and $l_2$-norm perturbation constraints 128 around the data points 126. FIG. 1B illustrates that a trained DNN with a uniform perturbation constraint 128 of $\|\delta\|_2 \leq 0.8$, selected to fit allowable perturbations along the y-axis 125, results in a loss of performance in the x-axis 123 due to the overlaps 129 of the perturbations. As a result, the classifier may incorrectly classify points such that some of the data points, such as data points 126-1 and 126-2 are incorrectly classified. Again, the uniformity of the constraint in both the x-axis and the y-axis results in an insufficient overall training of the DNN.

If the perturbation constraints are selected in accordance with the disclosed implementations such that the constraints are non-uniform, the robustness of the DNN can be further improved. For example and referring to FIG. 1C, with the disclosed implementations, the perturbation constraints are non-uniform. For example, the graph 130 illustrates adversarially robust decision boundaries with a first region 132 and second region 134, and non-uniform $l_2$-norm perturbation constraints 138 around the data points 136 such that $\|\delta_x\|_2 \leq 0.5$ and $\|\delta_y\|_2 \leq 0.8$. As illustrated, with the non-uniform perturbation constraints 138, the resulting perturbation regions 138 around the data points 136 are ellipsoid in shape (i.e., non-uniform).

Fitting the perturbation constraints 138 to both the x-axis 133 and the y-axis 135 in a non-uniform manner as illustrated and in accordance with the disclosed implementations provides a technological improvement over existing systems through the increase in overall robustness of trained DNNs to adversarial attacks, without increasing the loss. As discussed further below, non-uniform perturbations are realized through transformed input perturbation constraints $\|\Omega\delta\|_p \leq \epsilon$ where Ω is a transformation matrix. The transformation matrix takes available information about the inputs into account, such as feature importance, feature correlations and/or domain knowledge. As a result, the transformation results in non-uniform input perturbations over the features. As discussed further below, with the disclosed implementations, the DNNs trained in accordance with the disclosed implementations for various applications such as malware detection, credit risk prediction, spam detection, etc., result in increased robustness compared to traditional systems that utilize uniform perturbations and treat all features equally.

Figure 2:
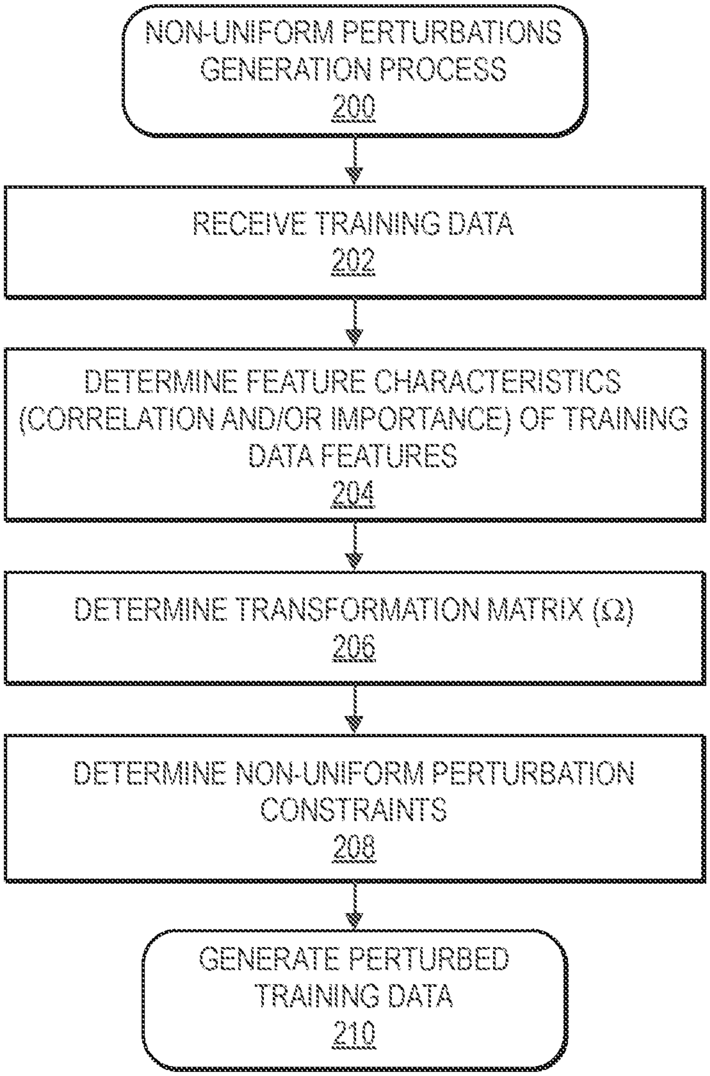
FIG. 2 is an example non-uniform perturbations generation process, in accordance with disclosed implementations.

FIG. 2 is an example non-uniform perturbations generation process 200, in accordance with disclosed implementations.

The example process 200 begins by receiving training data which may include both malicious data and benign data (non-malicious data), as in 202. As discussed below, some or all of the training data may be labeled or unlabeled.

In adversarial training, the worst case loss for an allowed perturbation region is minimized to learn the function that represents the classifier as presented in equation (1) above. The objective of the adversary can be written as the inner maximization of equation (1):

$$\underset{\delta\epsilon\Delta_{\epsilon,p}}{\text{maximize}}\; l(f_\theta(x+\delta), y) \tag{2}$$

where l is the DNNs loss; $f_\theta: \mathbb{R}^d \rightarrow \mathbb{R}^C$ is the DNN with parameter θ; $\Delta_{\epsilon,p} = \{\delta: \|\delta\|_p \leq \epsilon\}$ is an $l_p$ ball of radius ϵ which defines the feasible perturbation region.

Traditional projected gradient descent ("PGD") follows a steepest descent which iteratively updates δ in the gradient direction to increase the loss:

$$\delta^{t+1} = \delta^t + \alpha \frac{\nabla_\delta l(f_\theta(x+\delta^t), y)}{\|\nabla_\delta l(f_\theta(x+\delta^t), y)\|_p} \tag{3}$$

at iteration t, and then projects δ to the closest point onto $l_p$ ball:

$$\mathcal{P}\Delta_{\epsilon,p}(\delta) := \underset{\delta'\epsilon\Delta_{\epsilon,p}}{\text{argmin}} \|\delta - \delta'\|_2^2 \tag{4}$$

where the distance between δ and δ' is the Euclidean distance. This projection corresponds to normalization of δ to have a maximum $l_p$ norm which is equal to ϵ, that is:

$$\mathcal{P}\Delta_{\epsilon,p}(\delta) = \epsilon \frac{\delta}{\max\{\varepsilon\|\delta\|_p\}} \tag{5}$$

In traditional systems, the projection back to the $l_p$ norm with uniform perturbations may be represented or considered as a ball or sphere (in three-dimensional space) or a circle (in two-dimensional space), as illustrated in FIGS. 1A and 1B. In comparison, with the disclosed implementations, through use of non-uniform perturbations, the resulting shape of the projection is arbitrary—it is not a uniform ball/circle.

Referring back to FIG. 2, the feature characteristics of the training data are determined, as in 204. Feature characteristics may include, but are not limited to the correlations of different features of the training data, the importance of features of the training data to detection of malicious data, etc. In some implementations, the feature characteristics for which training is to be based may be determined based on the type of training being performed. For example, if it is determined that the pairwise relationship between features of the training data is of primary importance, a transformation matrix may be determined based on Mahalanobis distance which, when applied to some or all of the training data determines how features of the training data are scaled and correlated to one another. Mahalanobis distance is discussed further below.

As another example, if the DNN is being trained to detect malware, it may be more important to determine which features are more important than other features of the training data. For example, some features of malicious data may be immutable in that, if the features were changed, the change would eliminate the purpose or operability of the attacking malware. As such, an attacker would not change these features and, therefore, these features are not important for perturbation purposes and/or malicious data detection. In comparison, other features, which would not impact the malware, may be changed by an attacker and are therefore more important for perturbation. As another example, if the DNN is being trained to detect false or malicious data provided to a credit card application processing service, it may be determined that the pairwise relationships or dependencies of features of the data are more important for training purposes. For example, the pairwise relationship between the age of an applicant and a number of dependents may be more important for detecting malicious data.

Based on the feature characteristics determined to be of primary importance for adversarial training, a transformation matrix is determined, as in 206. For example, if the feature characteristic of feature importance is determined to be a primary factor for adversarial training, a transformation matrix may be determined based on Shapley Additive explanations ("SHAP") which, as is known in the art, utilizes a deep learning explainer to process some or all of the training data to determine a transformation matrix for the training data. Alternatively, or in addition thereto, Pearson's correlation coefficients may be determined for features of training data. Utilizing either or both SHAP and/or Pearson's correlation with respect to the training data, a diagonal transformation matrix ($\Omega$) may be produced and the inner maximization constraint discussed above may become the weighted norm of $\delta$ limited by $\epsilon$. With such a transformation matrix, and selection of weights from SHAP or Pearson's correlation, more important features are allowed to be perturbed more than other features of the training data. SHAP and Pearson's correlation are discussed further below. To non-uniformly limit variation in different, potentially correlated dimensions, a perturbation constraint set, illustrated by equation (6) below, may be utilized, as in 208:

$$\tilde{\Delta}_{\epsilon,p} = \{\delta : \|\Omega\delta\|_p \le \epsilon\} \quad (6)$$

where $\Omega \in \mathbb{R}^{d \times d}$ and is determined based on the feature relationships. In this approach, $\delta$ is updated by equation (3) and projected back to a non-uniform norm ball satisfying $\|\Omega\delta\|_p \le \epsilon$. The corresponding projection operator will then be:

$$\mathcal{P}_{\tilde{\Delta}_{\epsilon,p}}(\Omega\delta) = \begin{cases} \epsilon\dfrac{\delta}{\|\Omega\delta\|_p} & \text{if } \|\Omega\delta\|_p > \epsilon \\ \delta & \text{otherwise} \end{cases} \quad (7)$$

In some implementations, expert knowledge of a domain, such as a malware domain, may also be used to further refine or design the perturbation constraint set.

Based on the non-uniform perturbation set, perturbation training data is generated for use with the training data, both malicious and benign, to train the DNN, as in 210. In some implementations, only training data that is malicious data may be perturbed to produce perturbed training data. In other implementations, both malicious data and benign data of the training data may be perturbed.

By formal definition, Mahalanobis distance between vectors $z, z' \in \mathbb{R}^d$ is denoted by:

$$d_M(z, z'|M) := \sqrt{(z - z')^T M (z - z')} \quad (8)$$

where $M \in \mathbb{R}^{d \times d}$ is a positive semi-definite matrix which can be decomposed as $M = U^T U$, for $U \in \mathbb{R}^{d \times d}$.. The dissimilarity between two vectors from a distribution with covariance $\Sigma$ can be measured by selecting $M = \Sigma^{-1}$. If feature vectors of a dataset are uncorrelated and have unit variances, their covariance matrix is $\Sigma = I$, which reduces their Mahalanobis distance to Euclidean distance.

In the disclosed implementations, Mahalanobis distance may be used to determine the distance between an original sample and the corresponding perturbed sample. Assuming all perturbations are additive, the distance between the original and corresponding perturbed sample may be defined as $\sqrt{\delta^T M \delta}$. For a generalized Mahalanobis distance in $l_p$ norm, selecting $\Omega = U^T$ corresponds to the perturbation set $\Delta_{\epsilon,p} = \{\delta : \|U^T\|_p \le \epsilon\}$ which generates adversarial examples with feature correlations similar to the original dataset.

Robustness of an adversarially trained model is directly related to how realistic the generated malicious data and/or perturbed malicious data are during training. When the labeled training data is Gaussian as the $l_2$ Mahalanobis distance of the perturbations decreases, the perturbed malicious data becomes more consistent.

In some implementations, only benign training data may be considered in determining the transformation matrix using Mahalanobis, referred to herein as Mahalanobis target, or "MDtarget." In other examples, both malicious and benign training data may be considered in determining the transformation matrix using Mahalanobis, referred to herein as Mahalanobis or "MD."

For Weighted Norm, when $\Omega$ is a diagonal matrix, the inner maximization constraint becomes the weighted norm of $\delta$ limited by $\epsilon$, and the weights are denoted by $$\{\Omega_{i,i}\}_{i=1}^{d}.$$

Projection of $\delta$ under new constraint corresponds to projection onto an $l_p$ norm ball of radius $$\frac{\epsilon}{\Omega_{i,i}}$$

for $i^{th}$ feature. These weights can be chosen, for example, based on the domain type for which the DNN is being trained. For example, more important features may be allowed to be perturbed more than the other features which have less effect on the output score of the classifier. In some implementations, model or domain knowledge may be determined from Pearson's correlation coefficients between the features of the training data and the corresponding labels, and/or Shapley values determined from SHAP for each feature.

For example, using Pearson's correlation coefficient of each feature with the corresponding target variable, i.e., $|\rho_{i,y}|$ for $i^{th}$ feature and output y, a larger perturbation radii for more correlated features may be utilized for the output. Due to the inverse relation between $\Omega_{i,i}$ and the radius of the ball, for $$\overline{\rho}_{i,y} = \frac{1}{|\rho_{i,y}|}:$$

$\Omega$ may be selected as $$\Omega = \frac{\mathrm{diag}\left(\{\overline{\rho}_{i,y}\}_{i=1}^{d}\right)}{\left\|\{\overline{\rho}_{i,y}\}_{i=1}^{d}\right\|_2}.$$

Similarly, using Shapley values to represent feature importance, $s_i$ may be defined as the Shapley value of feature i and $$\overline{s}_i = \frac{1}{|s_i|}.$$

To increase the radii for larger perturbations of important features:

$\Omega$ may be selected as $$\Omega = \frac{\mathrm{diag}\left(\{\overline{s}_i\}_{i=1}^{d}\right)}{\left\|\{\overline{s}_i\}_{i=1}^{d}\right\|_2}.$$

In the malware domain, domain knowledge may be modeled using weighted norm, as discussed above. Hence, the non-uniform perturbation approach enables various transformations on the malicious data to gain robustness against realistic attacks.

Figure 3:
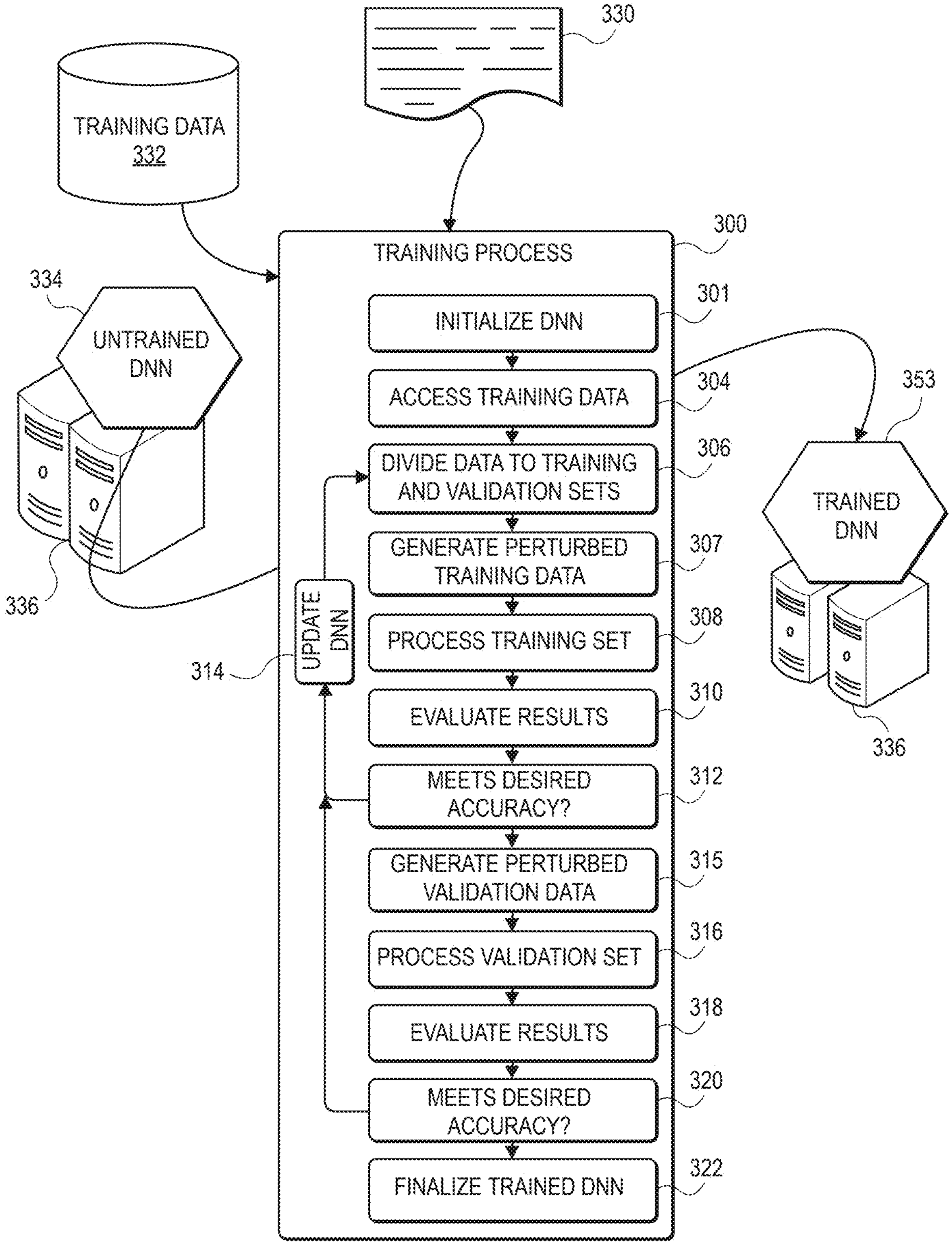
FIG. 3 is an example training process for training a deep neural network for detection of malicious data, in accordance with disclosed implementations.

FIG. 3 illustrates an exemplary overall process 300 of training a DNN in accordance with aspects of the disclosed subject matter. Indeed, as shown in FIG. 3, the training process 300 is configured to train an untrained DNN 334 operating on a computer system 336 to transform the untrained DNN into a trained DNN 353 that operates on the same or another computer system, such as a remote computing resource 336. In the course of training, as shown in the training process 300, at step 301, the untrained DNN 334 is initialized with training criteria 330. Training criteria 330 may include, but is not limited to, information as to a type of training, and number of layers to be trained, etc.

At step 304 of training process 300, a corpus of training data 332, which may include both malicious data and benign data, is accessed. For example, if training is to generate a trained DNN that detects malware, the training data 332 may include malware (malicious data) and benign data (i.e., data that does not include malware).

The disclosed implementations discuss the use of labeled training data, meaning that the actual results of processing of the data items of the corpus of training data (i.e., whether the data corresponds to a positive or negative presence of a condition) are known. Of course, in various implementations, the training data 332 may also or alternatively include unlabeled training data.

With the training data 332 accessed, at step 306 the training data is divided into training and validation sets. Generally speaking, the items of data in the training set are used to train the untrained DNN 334 and the items of data in the validation set are used to validate the training of the DNN. As those skilled in the art will appreciate, and as described below in regard to much of the remainder of training process 300, there are numerous iterations of training and validation that occur during the training of the DNN.

At step 307, some or all of the items of data of the training set are perturbed in accordance with the disclosed implementations to produce perturbed training items of data. The perturbed training items of data are added to the training set along with the original items of data included in the training set. In some implementations, only malicious data items included in the training set may be perturbed. In other implementations, both malicious data and benign data of the training set may be perturbed.

At step 308 of the training process, the data items of the training set, both perturbed data items and clean data items (i.e., original items of the training set), are processed, often in an iterative manner. Processing the data items of the training set include capturing the processed results. After processing the items of the training set, at step 310, the aggregated results of processing the training set are evaluated, and at step 312, a determination is made as to whether a desired accuracy level has been achieved. If the desired accuracy level is not achieved, in step 314, aspects of the DNN are updated in an effort to guide the DNN to generate more accurate results, and processing returns to step 306, where a new set of training data is selected, and the process repeats. Alternatively, if the desired accuracy level is achieved, the training process 300 advances to step 315.

At step 315, and much like step 307, some or all of the items of data of the validation set are perturbed in accordance with the disclosed implementations to produce perturbed validation items of data. The perturbed validation items of data are added to the validation set along with the original items of data included in the validation set. In some implementations, only malicious data items included in the validation set may be perturbed. In other implementations, both malicious data and benign data of the validation set may be perturbed.

At step 316, and much like step 308, the data items of the validation set, both perturbed data items and clean data items (i.e., original items of the validation set), are processed, and at step 318, the processing accuracy of this validation set is aggregated and evaluated. At step 320, a determination is made as to whether a desired accuracy level, in processing the validation set, has been achieved. If the desired accuracy level is not achieved, in step 314, aspects of the DNN are updated in an effort to guide the DNN to generate more accurate results, and processing returns to step 306. Alternatively, if the desired accuracy level is achieved, the training process 300 advances to step 322.

At step 322, a finalized, trained DNN 353 is generated. Typically, though not exclusively, as part of finalizing the now-trained DNN 353, portions of the DNN that are included in the model during training for training purposes are extracted, thereby generating a more efficient trained DNN 353.

Figure 4:
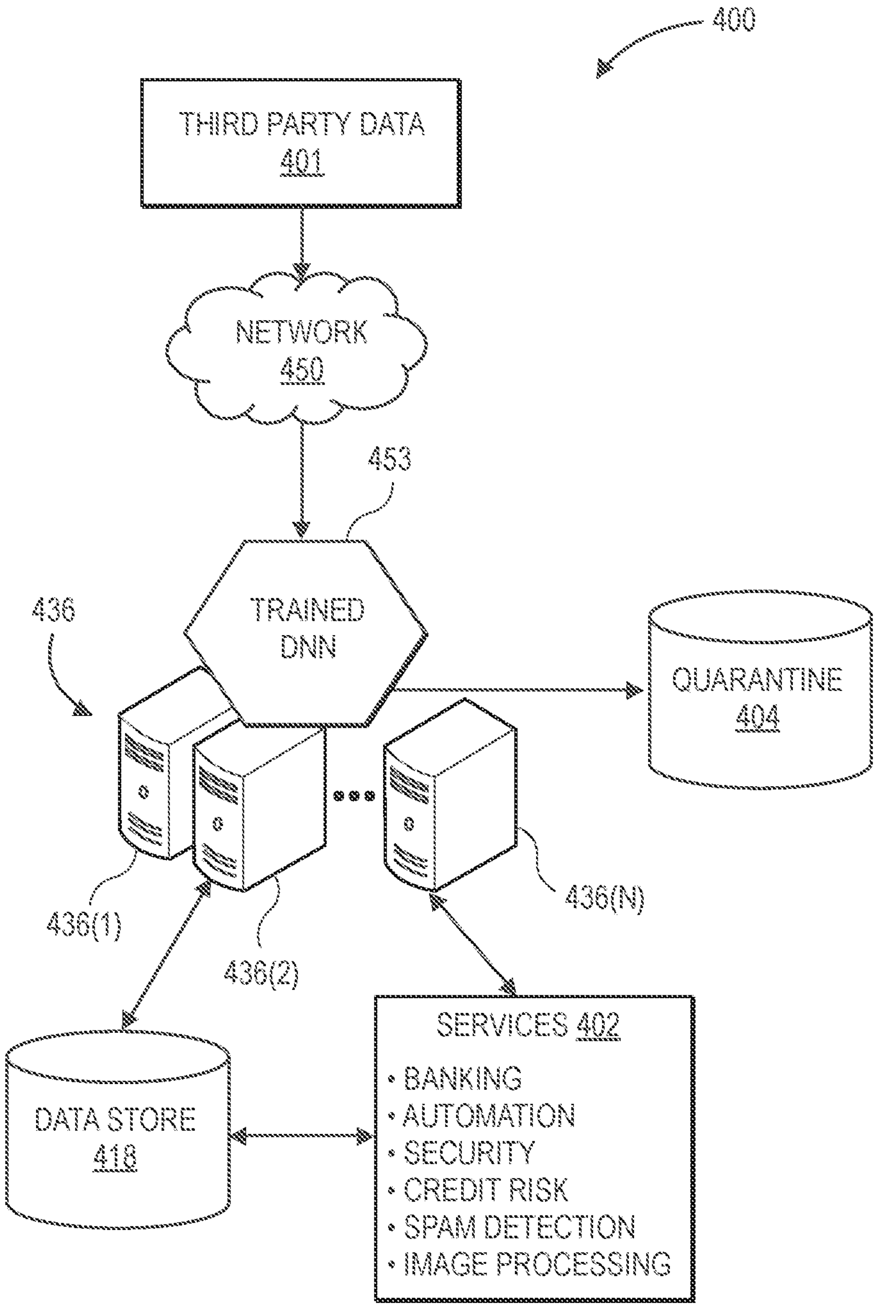
FIG. 4 is a block diagram of an example network configuration that includes a trained deep neural network, in accordance with disclosed implementations.

FIG. 4 is a block diagram of an example network configuration 400 that includes a trained deep neural network 453, in accordance with disclosed implementations.

As illustrated, the computing resource(s) 436 may be implemented as one or more servers 436(1), 436(2), . . . , 436(N) and may, in some instances, form a portion of a network-accessible computing platform implemented as a computing infrastructure of processors, storage, software, data access, and so forth that is maintained and accessible by other components/devices/systems via a network 450, such as an intranet (e.g., local area network), the Internet, etc.

The remote computing resource(s) 436, and each of the other computing resources discussed herein, do not require end-user knowledge of the physical premises and configuration of the system that delivers the services. Common expressions associated with these remote computing resource(s) 436 include "on-demand computing," "software as a service (SaaS)," "platform computing," "network-accessible platform," "cloud services," "data centers," and so forth. Example components of a server that may be or be included in computing resources 436 is discussed below with respect to FIG. 7.

The network 450, and each of the other networks discussed herein, may utilize wired technologies (e.g., wires, USB, fiber optic cable, etc.), wireless technologies (e.g., radio frequency, infrared, NFC, cellular, satellite, Bluetooth, etc.), or other connection technologies. The network 450 is representative of any type of communication network, including data and/or voice network, and may be implemented using wired infrastructure (e.g., cable, CAT5, fiber optic cable, etc.), a wireless infrastructure (e.g., radio frequency, cellular, microwave, satellite, Bluetooth, etc.), and/or other connection technologies.

The remote computing resources 436 and the trained DNN 453 executing thereon, may receive, via the network 450, third party data 401 from any of a variety of third parties that is intended as input to one or more services 402, such as a banking service, automation service (e.g., self-driving cars), security (e.g., credit card applications/verification), credit risk services, spam detection services, image processing services, etc. Alternatively, or in addition thereto, the third party data 401 may be intended for storage in one or more data stores 418. For example, the remote computing resources 436 and/or other remote computing resources, in addition to providing the disclosed implementations, may also provide other third party accessible services, such as data storage, virtual computing, and/or other services 402 in which third party data may be stored and/or maintained in a data store 418, and/or otherwise used or processed.

In other examples, the DNN 453 may be configured to periodically process data stored in the data store 418 to detect for malware and/or other adversarial attacks. For example, as training and robustness of the DNN 453 is improved, for example through detection and subsequent training for new malware and perturbations thereof, and/or additional perturbations of existing/known malware, the DNN 453 may periodically scan data maintained in the data store 418 to detect new or existing adversarial attacks that may be present in the data stored in the data store 418.

In some implementations, as discussed herein, the trained DNN 453 may also include or access a quarantine data store 404. The quarantine data store 404 may be used to store input data determined by the DNN 453 to include malicious data. Alternatively, or in addition thereto, the quarantine data store 404 may be a controlled environment in which data that is or potentially includes malicious data may be processed and/or executed without causing malicious behavior by any malicious data.

Figure 5:
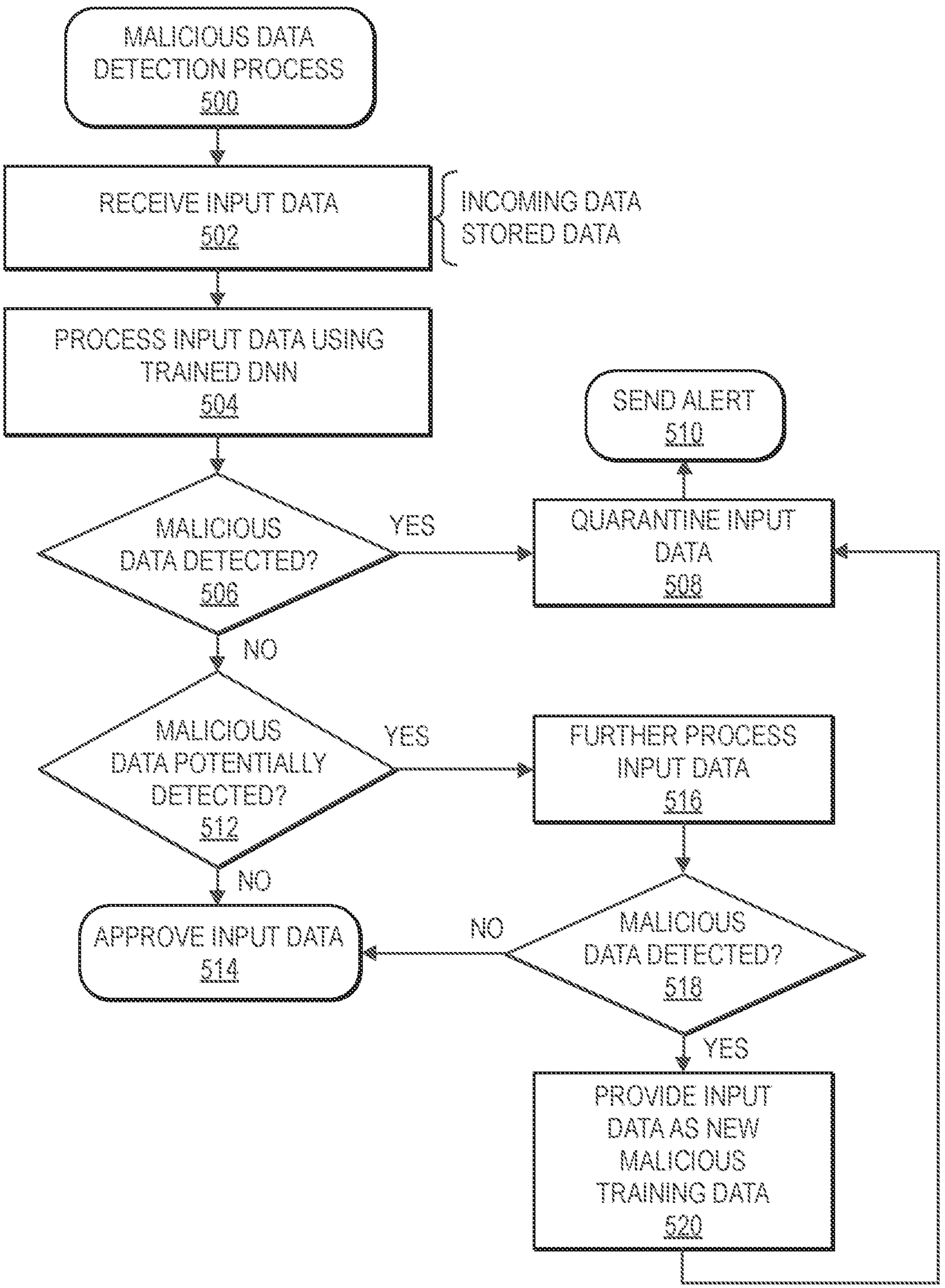
FIG. 5 is an example malicious data detection process, in accordance with disclosed implementations.

FIG. 5 is an example malicious data detection process 500, in accordance with disclosed implementations. The malicious data protection process 500 may be performed by any DNN trained in accordance with the disclosed implementations.

The example process 500 begins with the receipt of input data to be processed by the DNN to determine if the input data is malicious data, as in 502. As discussed above, the received input data may be data that is received over a network from a third party and/or data that is maintained in a data store accessible to the DNN and the example process 500.

Upon receipt of the input data, the input data is processed using the trained DNN, trained in accordance with the disclosed implementations, to determine if the input data is malicious data, as in 504. In this example, the DNN may process the input data to determine a probability score indicative of a probability that the data is malicious data. For example, the DNN may generate a probability score between 0.0 and 1.0 indicative of a probability that the input data is malicious data, with 0.0 indicating no probability of the data being malicious data and a probability score of 1.0 indicating that the data is malicious data. While the disclosed example describes the DNN outputting a probability score, in other implementations, the DNN may provide other indications, such as a binary output (e.g., yes/no, 1/0), as to whether the input data is determined to be malicious data or whether the input data is benign data. In still other examples, the DNN may output different ranges of likelihood as to whether the data is malicious data (e.g., yes/possible/no).

Based on the output produced from a processing of the input data by the DNN, a determination is made as to whether the data is malicious data, as in 506. Continuing with the above example in which the DNN outputs a probability score indicative of a probability that the data is malicious data, a first threshold may be defined that, if exceeded by the output probability score, it may be determined that the data is malicious data. The first threshold may be any value or indicator and may be different for different DNNs, different input data sources, different systems that are to receive the data, etc. As another example, if the trained DNN outputs multiple indicators (e.g., yes/potentially/no) and the output indicator indicates that the data is malicious data, it may be determined at decision block 506 that malicious data has been detected by the trained DNN.

If it is determined that the input data is malicious data, the input data may be quarantined, as in 508, and an alert may be generated or output by the example process 500 indicating that malicious data has been detected, as in 510. For example, if the input data processed by the DNN is stored in a data store on behalf of a third party and it is determined that the data includes malicious data, the data may be quarantined and an alert may be sent to the third party to inform the third party that malicious data has been detected.

If it is determined that the input data is not determined to be malicious data, in some implementations, it may be determined whether the input data is potentially malicious data, as in 512. Continuing with the above example in which a probability score is output by the trained DNN, a second threshold may be established such that, if the probability score exceeds the second threshold but does not exceed the first threshold it may be determined that the data is potentially malicious data. Like the first threshold, the second threshold may be any value or indicator and may be different for different DNNs, different input data sources, different systems that are to receive the data, etc. As another example, if the trained DNN outputs multiple indicators (e.g., yes/potentially/no) or if the output indicator indicates that the data is potentially malicious data, it may be determined at decision block 512 that malicious data has potentially been detected by the trained DNN.

If it is determined that the data is potentially malicious data, the data may be sent for further processing, as in 516. For example, if the data includes an executable file, the data may be quarantined and executed in a controlled environment to determine if the executable file is malicious. As another example, the data may be processed or reviewed by one or more agents to determine if the data is potentially malicious.

Based on the result of the additional processing of the data, a determination is made as to whether malicious data is detected, as in 518. If it is determined that malicious data is detected, the malicious data may be provided as new malicious training data, as in 520. For example, as new malicious data is detected by the example process 500 or otherwise determined or made available, the new malicious data may be utilized as training data. In addition, and in accordance with the disclosed implementations, perturbations may also be generated from the newly identified malicious training data.

To continue improving the robustness of the trained DNN, newly identified malicious training data, whether determined from the example process 500 or otherwise identified, along with perturbations thereof, may be used as training data to continue training the trained DNN, thereby further increasing the robustness of the DNN.

Returning to FIG. 5, after providing the data determined to be malicious as new training data, the example process 500 returns to block 508 and continues.

If it is determined at decision block 518 that the data is not malicious data or if it is determined at decision block 512 that the data is not potentially malicious data, the data is approved as benign data (i.e., non-malicious data), as in 514, and the example process 500 completes.

Figure 6:
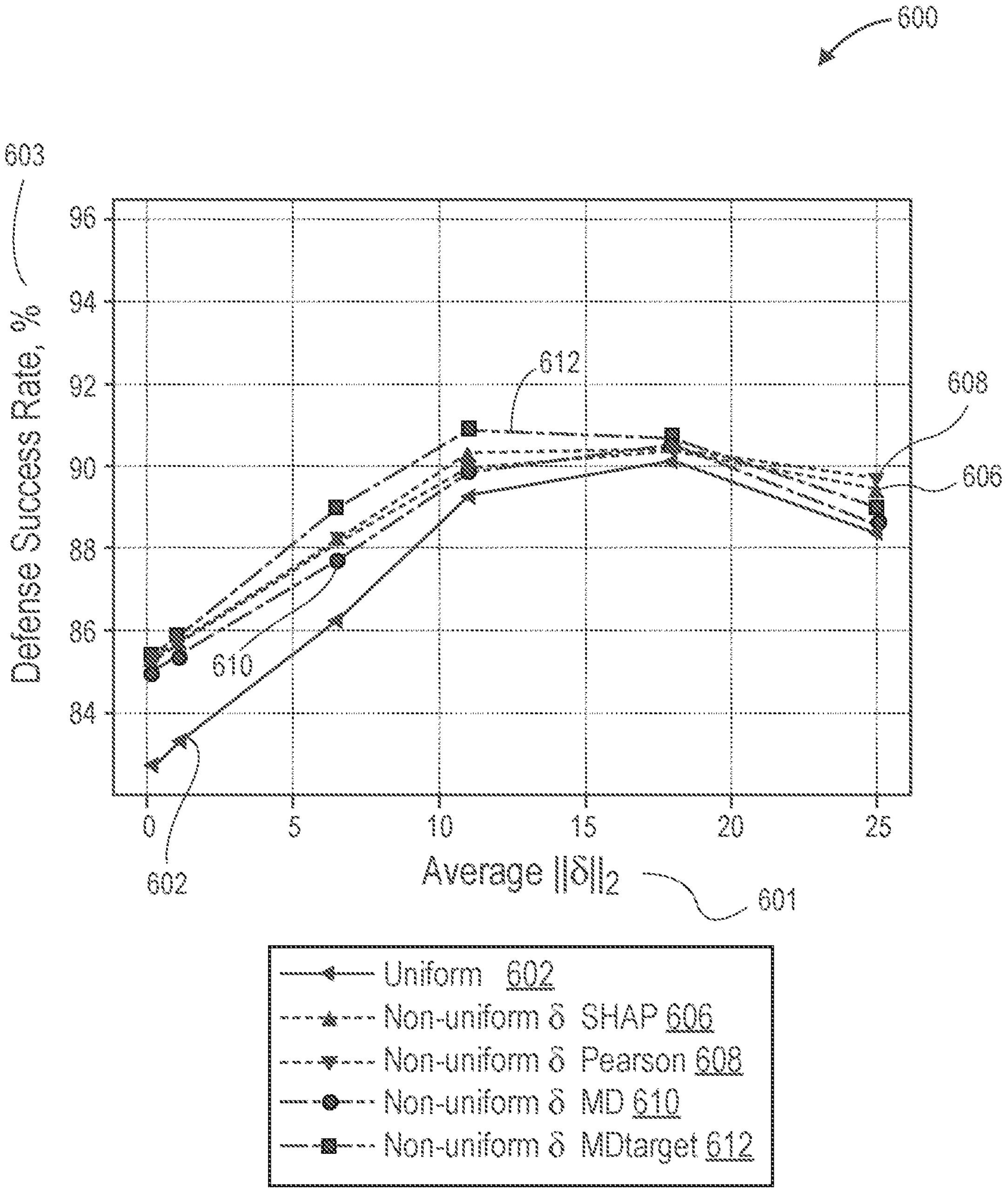
FIG. 6 is a graph illustrating the defense success rate of a deep neural network trained with different perturbation approaches, in accordance with disclosed implementations.

FIG. 6 is a graph 600 illustrating the defense success rate of a trained DNNs, in accordance with disclosed implementations.

To illustrate the technical improvement of the disclosed implementations, the defense success rate 603 of trained DNNs with non-uniform perturbations 606, 608, 610, 612 is compared with a trained DNN with uniform perturbations 602. While the example is based on malware detection and binary classification, the disclosed implementations are equally applicable to multi-dimensional classification problems.

For the example results illustrated in FIG. 6, a fully-connected neural network model composed of four densely connected layers with the first three layers using ReLU activations and the fourth layer being a softmax activation layer was trained and utilized. To illustrate the comparison, normalization was used as a pre-processing step and min-max scaling transforms are used to scale all features.

In the illustrated example, adversarial training is performed in all use-cases by applying $l_2$-norm progressive gradient descent ("PGD") for uniform perturbation sets, i.e., $\Delta_{\epsilon_1}=\{\delta:\|\delta\|_2\leq\epsilon_1\}$, and non-uniform perturbation sets, i.e., $\Delta_{\epsilon_2 2}=\{\delta:\|\delta\|_2\leq\epsilon_2\}$. Because potential adversaries are not interested in perturbing benign data, δ perturbations are only applied to the malicious training data during adversarial training. In this example, adversarial training data are the malicious data in malware detection. In addition, in this example, perturbations are applied to 90% of the malicious training data during training.

To allow perturbation of important/mutable features, a diagonal transformation matrix (Ω) is specified based on one or more of Pearson's correlation coefficient 608 and Shapley values 606, as discussed above.

Training under the Mahalanobis distance (MD) constraint 610, 612 is also illustrated. For MD, $\Omega=U^T$ for $$U^T U = \sum\nolimits_y^{-1}$$

considering two cases: (1) $\Sigma_y$ is the covariance matrix calculated from the entire training data, i.e., y={0,1}, and $\Sigma_y$ is only for the benign training data y=0.

For discussion purposes, the trained DNNs are referenced in FIG. 6 according to the utilized non-uniform perturbations, namely non-uniform δ Pearson 608 for Pearson's coefficients, non-uniform δ SHAP 606 for Shapley values, non-uniform δ MDtarget 612 for Mahalanobis distance using the covariance matrix of only benign data, and non-uniform δ MD 610 for Mahalanobis distance using full covariance matrix. Finally, for comparison purposes, the uniform perturbation constraint, with Ω=I, is illustrated as Uniform δ 602.

The results illustrated in FIG. 6 are based on the detection success rate, or defense success rate 603, of each trained model detecting 9,000 instances of malicious data. As illustrated in the graph 600, as the average perturbation $\|\delta\|_2$ 601 increases, trained models become more robust at detecting malicious data up to a point between $\|\delta\|_2\in[11,18]$. After that point, accuracy begins to decrease in all models. Importantly, each DNN 606, 608, 610, 612 trained with non-uniform perturbations have a higher defense success rate 603 at each average perturbation 601 when compared with the model 602 trained with uniform perturbations.

Figure 7:
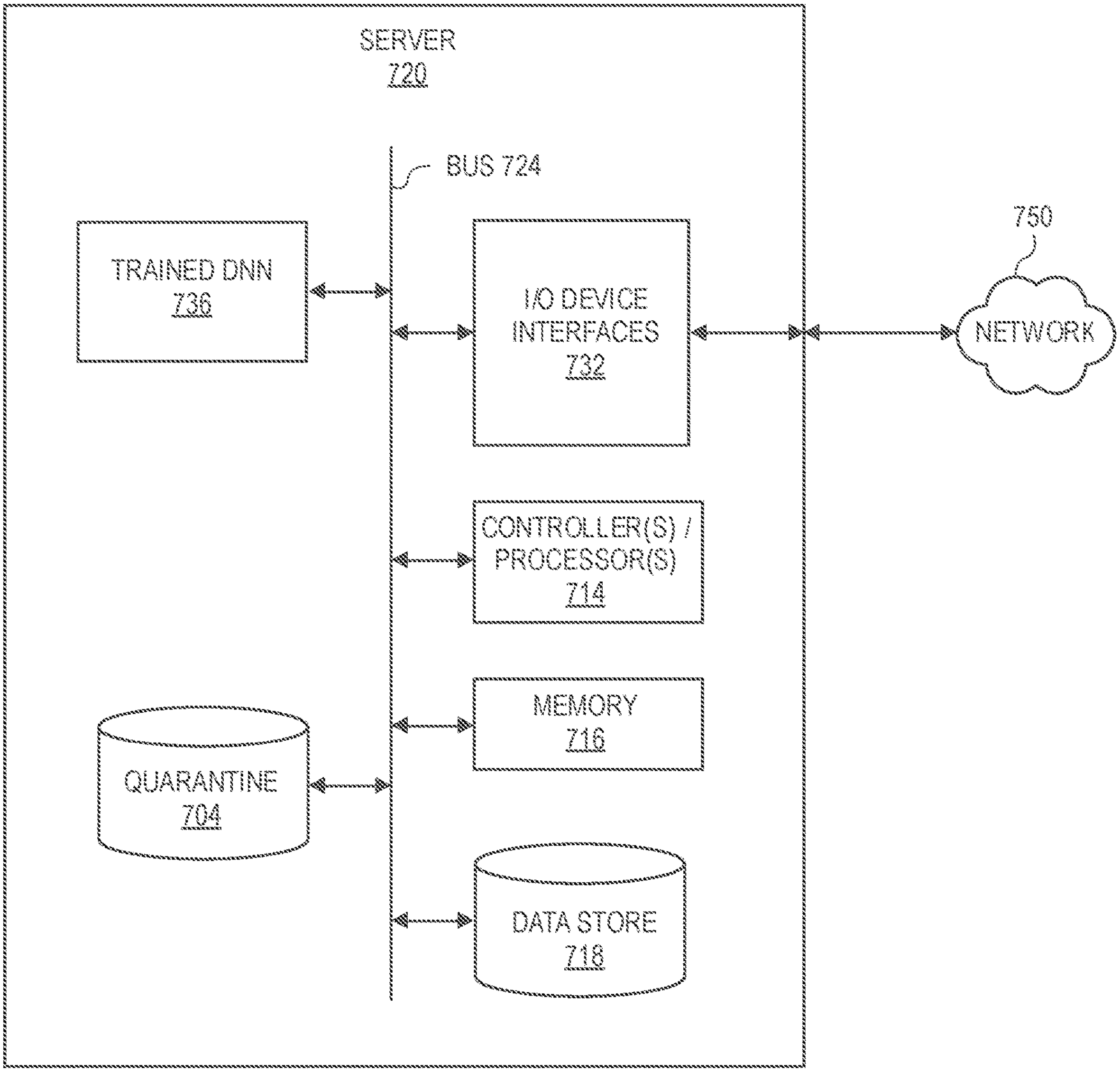
FIG. 7 illustrates example components of a server, in accordance with disclosed implementations.

FIG. 7 is a block diagram conceptually illustrating example components of a remote computing device, such as a remote server 720 that may include and/or execute one or more of the above discussed trained DNNs, in accordance with described implementations. Multiple such servers 720 may be included in the system.

Each of these server(s) 720 may include one or more controllers/processors 714, that may each include a central processing unit (CPU) for processing data and computer-readable instructions, and a memory 716 for storing data and instructions. The memory 716 may individually include volatile random access memory (RAM), non-volatile read only memory (ROM), non-volatile magnetoresistive (MRAM) and/or other types of memory. Each server may also include a data storage component 718, for storing data, controller/processor-executable instructions, training data, labels, etc. Each data storage component may individually include one or more non-volatile storage types such as magnetic storage, optical storage, solid-state storage, etc. Each server may also be connected to removable or external non-volatile memory and/or storage (such as a removable memory card, memory key drive, networked storage, etc.), internal, and/or external networks 750 (e.g., the Internet) through respective input/output device interfaces 732.

Computer instructions for operating each server 720 and its various components may be executed by the respective server's controller(s)/processor(s) 714, using the memory 716 as temporary "working" storage at runtime. A server's computer instructions may be stored in a non-transitory manner in non-volatile memory 716, storage 718, and/or an external device(s). Alternatively, some or all of the executable instructions may be embedded in hardware or firmware on the respective device in addition to or instead of software.

Each server 720 includes input/output device interfaces 732. A variety of components may be connected through the input/output device interfaces. Additionally, each server 720 may include an address/data bus 724 for conveying data among components of the respective server. Each component within a server 720 may also be directly connected to other components in addition to (or instead of) being connected to other components across the bus 724.

Each server may also include one or more trained DNNs 736, as discussed herein. Likewise, a quarantine 704 may also be included in or accessible to the server 720. The quarantine 704 may be a separate or isolated memory that may be used, as discussed above, to store detected malicious data and/or to further process or execute input data to determine if the input data is or includes malicious data, without allowing any malicious data to cause malicious activities.

The components of the server(s) 720, as illustrated in FIG. 7, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Moreover, with respect to the one or more methods or processes of the present disclosure shown or described herein, including but not limited to the flow charts shown in FIGS. 2, 3, and 5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:

receiving training data that includes a plurality of malicious training data items and a plurality of benign training data items;

determining, based at least in part on at least a portion of the training data, a feature characteristic of the training data;

determining, based at least in part on the feature characteristic, a transformation matrix;

determining, based at least in part on the transformation matrix, a non-uniform perturbation constraint set that limits variation in different, correlated dimensions of features of data items;

generating, from a first malicious training data item of the plurality of malicious training data items and based at least in part on the non-uniform perturbation constraint set, a perturbed training data item in which a first perturbation of a first feature of the first malicious training data item is non-uniform with respect to a second perturbation of a second feature of the first malicious training data item;

training a deep neural network using at least a portion of the plurality of malicious training data items and the perturbed training data item;

processing with the trained deep neural network, an input data;

determining, based at least in part on the processing, that the input data includes malicious data; and causing the input data to be quarantined without the input data causing malicious activity.

2. The computer-implemented method of claim 1, wherein the feature characteristic includes at least one of an importance of one or more features of a plurality of features of the training data or a pairwise relationship of at least one feature of the plurality of features to at least one other feature of the plurality of features.

3. The computer-implemented method of claim 1, wherein determining the transformation matrix is based at least in part on one or more of a Shapley additive explanation, a Pearson's coefficient, or a Mahalanobis distance.

4. The computer-implemented method of claim 1, wherein the transformation matrix causes the first feature of the first malicious training data item to be prioritized for perturbation over the second feature of the first malicious training data item.

5. The computer-implemented method of claim 1, wherein:

the first malicious training data item includes malware; and the deep neural network is trained to detect malware in received input data.

6. A computing system, comprising:

one or more processors; and a memory storing program instructions that, when executed by the one or more processors, cause the one or more processors to at least:

determine, for a plurality of training data items, a feature characteristic of a plurality of features of the plurality of training data items;

determine, based at least in part on the feature characteristic, a non-uniform perturbation constraint set that limits variation in different, correlated dimensions of features of data items;

generate, from a first training data item of the plurality of training data items and based at least in part on the non-uniform perturbation constraint set, a perturbed training data item in which a first perturbation of a first feature of the first training data item is non-uniform with respect to a second perturbation of a second feature of the first training data item, wherein the first feature and the second feature are included in the plurality of features;

train a deep neural network using at least a portion of the plurality of training data items and the perturbed training data item;

process with the trained deep neural network, an input data;

determine, based at least in part on the processing, that the input data includes malicious data; and causing the input data to be quarantined without the input data causing malicious activity.

7. The computing system of claim 6, wherein:

the plurality of training data items include a plurality of malicious training data items and a plurality of benign training data items; and the program instructions that, when executed by the one or more processors to generate, from the first training data item of the plurality of training data items and based at least in part on the non-uniform perturbation constraint set, the perturbed training data item, further include instructions that, when executed by the one or more processors, further cause the one or more processors to at least:

generate, based at least in part on the non-uniform perturbation constraint set, one or more perturbed training data items from each of the plurality of malicious training data items without generating perturbed training data items from the plurality of benign training data items.

8. The computing system of claim 6, wherein the program instructions that, when executed by the one or more processors, further cause the one or more processors to at least:

determine, based at least in part on the feature characteristic, a transformation matrix to transform one or more features of the first training data item of the plurality of training data items as part of the generation of the perturbed training data item.

9. The computing system of claim 8, wherein the transformation matrix is determined based at least in part on one or more of a Shapley additive explanation, a Pearson's coefficient, or a Mahalanobis distance.

10. The computing system of claim 9, wherein the Shapley additive explanation and the Pearson's coefficient determine that the first feature of the plurality of features is of a higher importance in training the deep neural network than the second feature of the plurality of features.

11. The computing system of claim 9, wherein the Mahalanobis distance determines a pairwise relationship between the first feature of the plurality of features and the second feature of the plurality of features.

12. The computing system of claim 6, wherein the feature characteristic includes at least one of an importance of one or more features of the plurality of features or a pairwise relationship of at least one feature of the plurality of features to at least one other feature of the plurality of features.

13. The computing system of claim 6, wherein:

the plurality of training data items include malicious training data items; and the deep neural network is trained to detect malicious data in received input data.

14. The computing system of claim 13, when the program instructions that, when executed by the one or more processors, further cause the one or more processors to at least:

subsequent to the deep neural network being trained, determine a first malicious data item for which the deep neural network was not trained;

generate, from the first malicious data item, a second perturbed training data item; and update training of the deep neural network using the first malicious data item and the second perturbed training data item.

15. A method, comprising:

determining, for a plurality of training data items, a non-uniform perturbation constraint set that limits variation in different, correlated dimensions of features of data items;

perturbing, in a non-uniform manner and based at least in part on the non-uniform perturbation constraint set, a first feature of a first training data item and a second feature of the first training data item to produce a perturbed training data item in which a first perturbation of the first feature of the first training data item is non-uniform with respect to a second perturbation of the second feature of the first training data item;

training a deep neural network using at least a portion of the plurality of training data items and the perturbed training data item to produce a trained deep neural network;

processing with the trained deep neural network, an input data;

determining, based at least in part on the processing, that the input data includes malicious data; and causing the input data to be quarantined without the input data causing malicious activity.

16. The method of claim 15, further comprising:

determining a feature characteristic of the plurality of training data items; and wherein determining the non-uniform perturbation constraint set includes determining the non-uniform perturbation constraint set based at least in part on the feature characteristic.

17. The method of claim 15, wherein the non-uniform perturbation constraint set causes the first feature to be perturbed by a first amount and the second feature to be perturbed by a second amount that is different than the first amount.

18. The method of claim 15, wherein the non-uniform perturbation constraint set causes the first feature to be perturbed by a first amount and a third feature of the first training data item to not be perturbed.

19. The method of claim 15, further comprising:

periodically processing, with the trained deep neural network, input data maintained in a data store to determine if the input data includes malicious data.

20. The method of claim 15, further comprising:

determining a first plurality of features of the training data to perturb; and determining a second plurality of features of the training data that are immutable and are not to be perturbed; and wherein:

the first feature and the second feature are included in the first plurality of features; and a third feature of the first training data item is included in the second plurality of features.

* * * * *